United States Patent
Bouthemy

(10) Patent No.: US 11,831,679 B2
(45) Date of Patent: Nov. 28, 2023

(54) GLOBAL NAVIGATION SATELLITE SYSTEM INTERFERENCE ATTACK DETECTION

(71) Applicant: T-Mobile USA, Inc., Bellevue, WA (US)

(72) Inventor: Jean-Luc Bouthemy, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 73 days.

(21) Appl. No.: 16/928,969

(22) Filed: Jul. 14, 2020

(65) Prior Publication Data
US 2022/0021702 A1    Jan. 20, 2022

(51) Int. Cl.
| | |
|---|---|
| H04L 9/40 | (2022.01) |
| H04B 7/185 | (2006.01) |
| G01S 19/21 | (2010.01) |
| H04W 12/122 | (2021.01) |
| H04B 7/0413 | (2017.01) |

(52) U.S. Cl.
CPC ........ H04L 63/1483 (2013.01); G01S 19/215 (2013.01); H04B 7/18565 (2013.01); H04W 12/122 (2021.01); H04B 7/0413 (2013.01)

(58) Field of Classification Search
CPC .............. H04L 63/1483; H04W 12/122; G01S 19/215; H04B 7/18565; H04B 7/0413
See application file for complete search history.

(56) References Cited

U.S. PATENT DOCUMENTS

| | | | |
|---|---|---|---|
| 7,912,643 B1 * | 3/2011 | Bean ..................... | G01S 19/215 |
| | | | 701/470 |
| 10,024,973 B1 * | 7/2018 | Alexander .............. | G01S 19/21 |
| 2013/0002477 A1 | 1/2013 | Dehnie et al. | |

(Continued)

FOREIGN PATENT DOCUMENTS

| | | |
|---|---|---|
| KR | 20180057002 A | 5/2018 |
| KR | 20200010902 A | 1/2020 |
| KR | 102088716 B1 | 3/2020 |

OTHER PUBLICATIONS

Yigit, Olcay et al., Dept. Electrical and Electronics Engineering, Ege Univ., Turkey. "GPS Signal Channel Modeling and Verification." Procedia Computer Science 113 (2017) p. 621-626.

(Continued)

Primary Examiner — Linglan Edwards
Assistant Examiner — Forrest L Carey
(74) Attorney, Agent, or Firm — Perkins Coie LLP

(57) ABSTRACT

Methods, apparatus, and systems for detecting signals interfering with satellite signaling and determining a location of the interfering source are disclosed. In one example aspect, a method for detecting a signal directed at interfering with satellite signaling includes receiving, by a receiving node, a signal from a signal source, the signal produced by the signal source disguised as a satellite signal; determining an estimated position of the receiving node based on an orbital position of the satellite and a characteristic of the signal; comparing the estimated position of the receiving node with a reference position of the receiving node; determining that the signal source is a spoofing source different than the satellite; and determine a location of the spoofing source in part based on the estimated position.

19 Claims, 11 Drawing Sheets

(56) References Cited

U.S. PATENT DOCUMENTS

| | | | |
|---|---|---|---|
| 2015/0226858 A1 | 8/2015 | Leibner et al. | |
| 2016/0154112 A1* | 6/2016 | Nichols | G01S 19/10 |
| | | | 342/357.47 |
| 2019/0353800 A1* | 11/2019 | Nirula | G01S 19/29 |
| 2020/0132854 A1 | 4/2020 | Kubina et al. | |
| 2020/0204250 A1* | 6/2020 | Ravishankar | H04W 36/00837 |
| 2020/0264317 A1* | 8/2020 | Faragher | G01S 19/23 |
| 2020/0371246 A1* | 11/2020 | Marmet | G01S 5/0215 |
| 2021/0003714 A1* | 1/2021 | Clark | G01S 3/48 |
| 2021/0109227 A1* | 4/2021 | Jones | G01S 19/215 |
| 2021/0124059 A1* | 4/2021 | Kowada | G01S 3/50 |
| 2022/0357459 A1* | 11/2022 | Seibert | G01S 5/0215 |

OTHER PUBLICATIONS

Montgomery, Paul Y. et al. "A Multi-Antenna Defense Receiver-Autonomous GPS Spoofing Detection." InsideGNSS, Mar./Apr. 2009, p. 40-46.

Intertanko. "Jamming and Spoofing of Global Navigation Satellite Systems (GNSS)." 2019, 16 pages.

International Searching Authority, International Search Report and Written Opinion, PCT Patent Application PCT/US2021/039690, dated Oct. 27, 2021, 12 pages.

* cited by examiner

1100

| FRAME |||||
|---|---|---|---|---|
| SUBFRAME 1 | SUBFRAME 2 | SUBFRAME 3 | SUBFRAME 4 | SUBFRAME 5 |
| CLOCK CORRECTION DATA | EPHEMERIS DATA | EPHEMERIS DATA | ALMANAC; REFRACTION MODEL DATA | ALMANAC DATA |

FIG. 11

GLOBAL NAVIGATION SATELLITE SYSTEM INTERFERENCE ATTACK DETECTION

BACKGROUND

A Global Navigation Satellite System (GNSS) refers to a constellation of satellites providing signals from space to transmit positioning and timing data to GNSS receivers. In general, GNSS signals have low power. A weak interference source can cause a GNSS receiver to fail or to produce hazardously misleading information. The issue of intentional or inadvertent interference to GNSS signals is of growing concern throughout the world.

BRIEF DESCRIPTION OF THE DRAWINGS

FIG. 11 illustrates an example frame of a frame 1100 of a satellite message in accordance with one or more embodiments of the present technology.

DETAILED DESCRIPTION

A spoofing attack is when a malicious party impersonates another device or user on a network in order to launch attacks against network hosts, steal data, spread malware or bypass access controls. Spoofing attacks on global satellite signals become more prevalent nowadays, especially with the advancement in 5G technology (e.g., denser deployment of cells) and in autonomous driving.

This patent document discloses techniques that can be implemented in various embodiments to allow global satellite signal receivers to detect whether a suspicious interfering signal (also referred to as a jamming or a spoofing signal) is present. Furthermore, for receivers that are equipped with multiple antennas, an estimated location of the jamming signal can be determined based on Multiple-In-Multiple-Out (MIMO) technology. The disclosed techniques are applicable to both fixed assets (e.g., base stations) that are aware of their locations and mobile assets (e.g., cell phones) that can obtain location information from other access technologies, such as the Long-Term Evolution (LTE) and/or the Fifth-Generation (5G) wireless communication networks.

Figure 1:
FIG. 1 illustrates an example scenario in which a GNSS receiver receives signals from a satellite in accordance with one or more embodiments of the present technology.

FIG. 1 illustrates an example scenario 100 in which a GNSS receiver receives signals from a satellite in accordance with one or more embodiments of the present technology. In some embodiments, the GNSS receiver 101 is aware of its own position (also referred to as a reference position). For example, the GNSS receiver 101 is a fixed station that knows its precise location based on configuration information (e.g., a base station configured by a cellular network). Alternatively, or in addition, the GNSS receiver 101 can calculate its reference position based on past signals it has received over time. As another example, the GNSS receiver 101 is a mobile device that is configured with a reference position. For example, the mobile device can be a mobile phone, a mobile tablet, a tracking device or telecommunications transceiver device deployed on vehicle such as an autonomous vehicle, AR/VR goggles, a wearable computing device (such as a smart watch or fitness tracker), or an Internet of Thing (IoT) device. The mobile device can receive assistance information from a cellular network indicating the mobile device's reference position. Based on the incoming signals, the GNSS receiver 101 can calculate an estimated position of itself based on the orbital position of the satellite and characteristics of incoming signals. By comparing the reference position with the estimated position, the GNSS receiver 101 can determine whether the incoming signal has been interfered (e.g., spoofed or jammed) by a GNSS jamming device.

Figure 2:
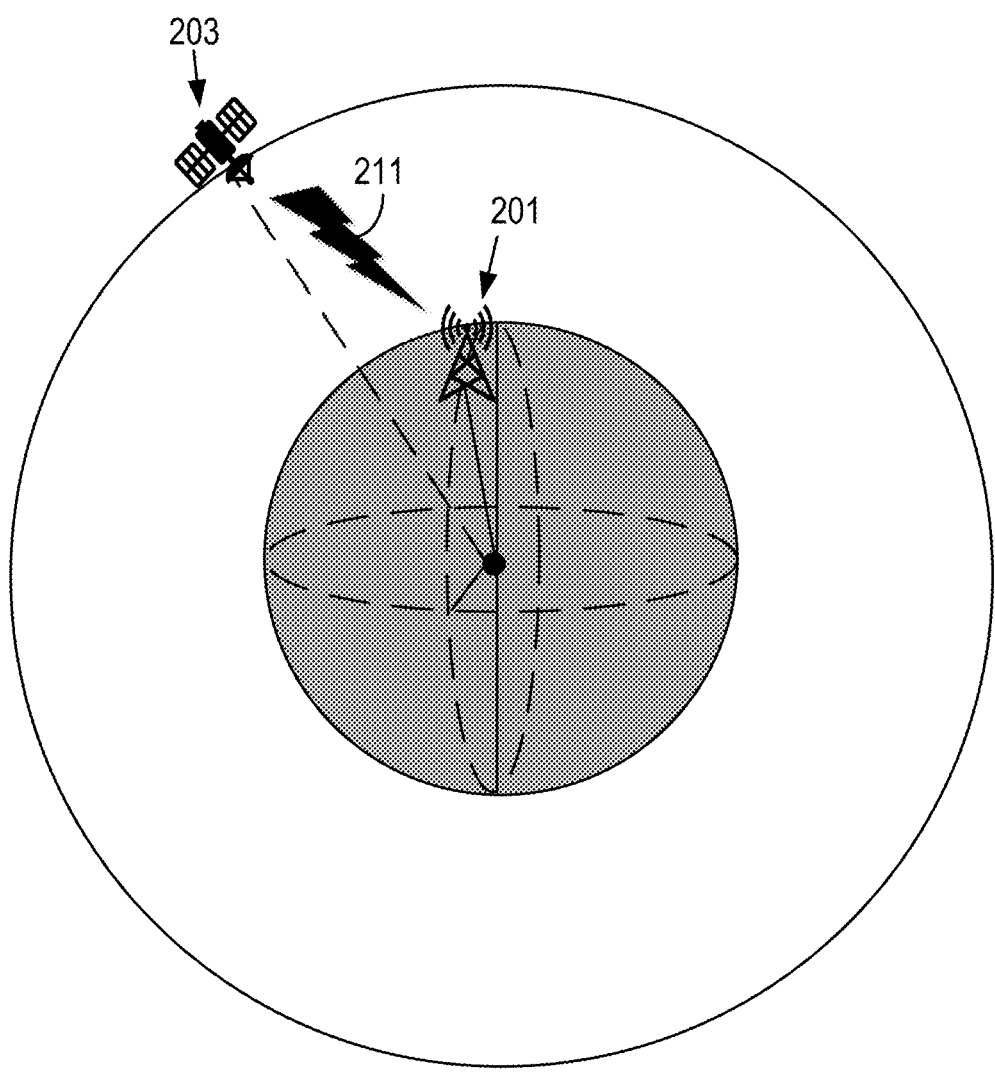
FIG. 2 illustrates an example of representing a position of a GNSS device or a satellite using spherical coordinates in accordance with one or more embodiments of the present technology.

FIG. 2 illustrates an example 200 of representing a position of a GNSS device or a satellite using spherical coordinates in accordance with one or more embodiments of the present technology. In this example, the GNSS receiver 201 stores its reference position with respect to the center of the Earth as $(r_1, \theta_1, \varphi_1)$. The reference position can be configured by a network or be calculated by the receiver 201 based on past signals. The GNSS receiver 201 is also aware of the precise orbital position of the satellite 203. The satellite 203 transmits a signal 211 that includes a message to the GNSS receiver 201. The message can include a satellite identifier (ID), a week number, and Ephemeris information about satellite's location. FIG. 11 illustrates an example frame of a frame 1100 of a satellite message in accordance with one or more embodiments of the present technology. The Ephemeris information can include the current location of the satellite, the prediction location of the satellite, and/or status of the satellite. The Ephemeris can be used by the GNSS receivers to estimate locations relative to the satellites and/or positions on earth. The Ephemeris information can also be used to predict future satellite conditions for a given place and/or time. The GNSS receiver 201 can derive its estimated location as $(r_2, \theta_2, \varphi_2)$ based on the orbital position of the satellite 203 and the characteristics of the signal 211.

Table 1 shows example Ephemeris parameters that can be used to determine satellite coordinates at an observation epoch. These can parameters are periodically renewed to ensure validity and accuracy of the satellite positions.

| Parameter | Explanation |
| --- | --- |
| $t_{oe}$ | Ephemerides reference epoch in seconds within the week |
| $\sqrt{a}$ | Square root of semi-major axis |
| e | Eccentricity |
| $M_o$ | Mean anomaly at reference epoch |
| $\omega$ | Argument of perigee |
| $i_o$ | Inclination at reference epoch |
| $\Omega_o$ | Longitude of ascending node at the beginning of the week |
| $\Delta_n$ | Mean motion difference |
| $i$ | Rate of inclination angle |
| $\dot{\Omega}$ | Rate of node's right ascension |
| $c_{uc}, c_{us}$ | Latitude argument correction |
| $c_{rc}, c_{rs}$ | Orbital radius correction |
| $c_{ic}, c_{is}$ | Inclination correction |

An example algorithm is shown below to compute satellite coordinates (non-spherical coordinates) from the satellite message.

Operation 101: compute the time $t_k$ from the ephemerides reference epoch $t_{oe}$ (t and $t_{oe}$ are expressed in seconds in a week).

$$t_k = t - t_{oe} \quad \text{Eq. (1)}$$

If $t_k$>302,400 seconds, subtract 604800 seconds from $t_k$. If $t_k$<−302400 seconds, add 604800 seconds.

Operation 102: compute the mean anomaly for $t_k$.

$$M_k = M_o + \left(\frac{\sqrt{\mu}}{a^3} + \Delta n\right) t_k \quad \text{Eq. (2)}$$

Operation 103: compute the true anomaly $v_k$:

$$v_k = \arctan\left(\frac{\sqrt{1-e^2} \sin E_k}{\cos E_k - e}\right) \quad \text{Eq. (3)}$$

Operation 104: compute the argument of latitude $u_k$ from the argument of perigee co, true anomaly $v_k$ and corrections $c_{uc}$ and $c_{us}$:

$$ur_k = \omega + v_k + c_{uc} \cos 2(\omega + v_k) + c_{us} \sin 2(\omega + v_k) \quad \text{Eq. (4)}$$

Operation 105: compute the radial distance $r_k$, considering corrections $c_{rc}$ and $c_{rs}$:

$$r_k = a(1 - e \cos E_k) + c_{rc} \cos 2(\omega + v_k) + c_{rs} \sin 2(\omega + v_k) \quad \text{Eq. (5)}$$

Operation 106: compute the inclination $i_k$ of the orbital plane from the inclination $i_o$ at reference time $t_{oe}$ and corrections $c_{ic}$ and $c_{is}$:

$$i_k = i_= + it_k + c_{ic} \cos 2(\omega + v_k) + c_{is} \sin 2(\omega + v_k) \quad \text{Eq. (6)}$$

Operation 107: compute the longitude of the ascending node $\lambda_k$ (with respect to Greenwich). This calculation uses the right ascension at the beginning of the current week ($\Omega_o$), the correction from the apparent sidereal time variation in Greenwich between the beginning of the week and reference time $t_k = t - t_{oe}$, and the change in longitude of the ascending node from the reference time $t_{oe}$:

$$\lambda_k = \Omega_o + (\dot{\Omega} - \omega_E) t_k - \omega_E t_{oe} \quad \text{Eq. (7)}$$

Operation 108: compute the coordinates in Terrestrial Reference System (TRS) frame, applying three rotations (around $u_k$, $i_k$, and $\lambda_k$):

$$\begin{bmatrix} X_k \\ Y_k \\ Z_k \end{bmatrix} = R_3(-\lambda_k) R_1(-i_k) R_3(-u_k) \begin{bmatrix} r_k \\ 0 \\ 0 \end{bmatrix} \quad \text{Eq. (8)}$$

$R_1$ and $R_3$ are the rotation matrices defined in Transformation between Terrestrial Frames.

In some embodiments, the GNSS receiver 201 can derive an estimated position of the receiver relative to the satellite 203 based on the reception angle and the magnitude of the signal 211. While only one satellite 203 is depicted in FIG. 2, a GNSS receiver can receive and decode signals from multiple satellites (e.g., between 4 to 24 satellites). For example, based on the amplitude of signals coming to the antenna, the GNSS receiver 201 can determine the power of received signals. If the GNSS receiver 201 is located in a rural or suburban area, the received signals can be deemed as the direct line of sight (LOS) signals because the receiver 201 does not receive much reflected signals from the nearby buildings. If the GNSS receiver 201 is located in an urban setting, random oscillating noise from reflections (e.g., reflections from nearby building) can be identified in the received signals. Based on the oscillating pattern, the GNSS receiver 201 can derive the power of the direct line of sight (LOS) signal by removing the oscillating noise. Based on the determined LOS signals, the GNSS receiver 201 can estimate the Longitude, Latitude, and Height positions of the satellite based on measuring the different speed of light (299,792 km/s) delays in the signals coming from the satellites. In some embodiments, each satellite signal includes the time the message was transmitted, orbital information (known as the Ephemeris information) and/or approximate orbits of the satellites (known as the Almanac information). The GNSS receiver 201 compares the estimated location (e.g., represented in spherical coordinates as $(r_2, \theta_2, \varphi_2)$) with the reference position (e.g., represented in spherical coordinates as $(r_1, \theta_1, \varphi_1)$) to determine whether the signal 211 can potentially be an interfering signal coming from a GNSS jamming device.

Figure 3:
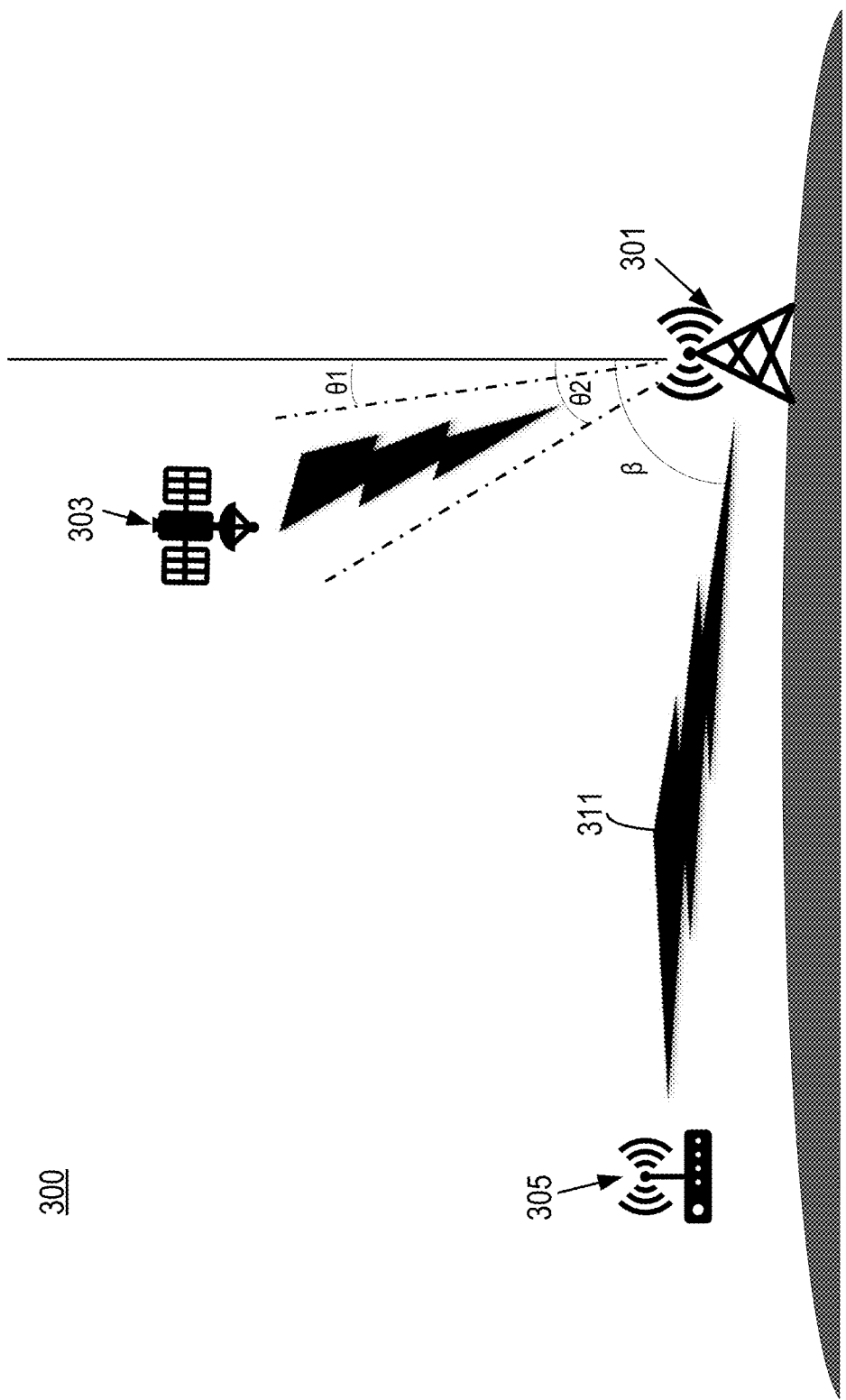
FIG. 3 illustrates an example of detecting a jamming signal that interferes satellite signals by a fixed station in accordance with one or more embodiments of the present technology.

In some embodiments, the GNSS receiver can be a fixed station, such as a base station in a cellular network, that knows its precise location. FIG. 3 illustrates an example 300 of detecting a jamming signal that interferes satellite signals by a fixed station in accordance with one or more embodiments of the present technology. In FIG. 3, a GNSS jamming device 305 transmits a jamming signal 311 towards to the fixed station 301 to interfere with signals from the satellite 303. In this example, the fixed station 301 only needs to check the actual reception angle of the signal 311 to determine whether the signal 311 is from the satellite or a jamming device. For example, upon receiving the jamming signal 311, the fixed station 301 calculates the reception angle β of the jamming signal 311 (e.g., represented using spherical coordinates). The fixed station 301 also derives a range of expected reception angles [$\theta_1, \theta_2$] with respect to its own position based on the orbital position of the satellite 303. Because β falls out of the range of expected reception angles [$\theta_1, \theta_2$], the fixed station 301 can determine that the signal 311 is a jamming signal coming from a jamming device 305. The fixed station 301 can carry out such determination for multiple satellites from which it receives signals.

Figure 4:
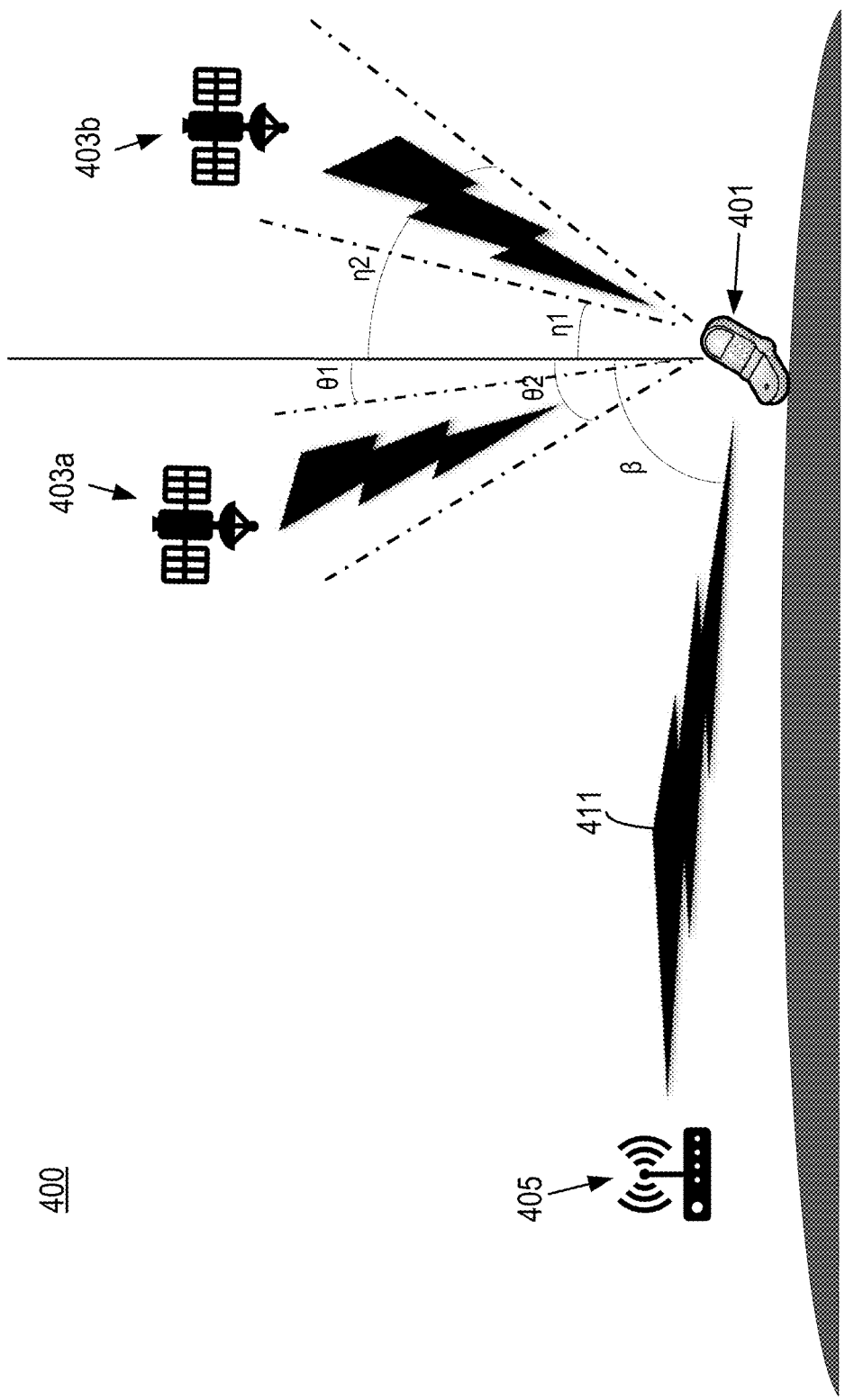
FIG. 4 illustrates an example of detecting a jamming signal that interferes a satellite signal by a mobile device in accordance with one or more embodiments of the present technology.

With advancement in cellular technologies, the techniques shown in FIG. 3 can be extended to mobile stations to allow mobiles stations to distinguish jamming signals from the actual satellite signals. For example, assisted Global Positioning System (A-GPS) is a technology implemented in many mobile devices to allow the locations of these devices to be determined by the cellular network. The mobile devices can receive assistance information from the cellular network so that they are aware of their respective positions. FIG. 4 illustrates an example 400 of detecting a jamming signal that interferes a satellite signal by a mobile device in accordance with one or more embodiments of the present technology. In FIG. 4, the mobile station 401 can obtain its own reference position from a cellular network based on techniques such as cell identifiers (IDs) and/or triangulation. A GNSS jamming device 405 transmits a jamming signal 411 towards the mobile station 401 to interfere with signals from satellites 403a, 403b. Upon receiving the jamming signal 411, the mobile station 401 calculates the reception angle β of the jamming signal 411 (e.g., represented using spherical coordinates). The mobile station 401 also derives respective ranges of expected reception angles [$\theta_1$, $\theta_2$] and [$\eta_1$, $\eta_2$] relative to its own position based on the orbital positions of the satellites 403a, 403b. Because β falls out of these ranges (e.g., [$\theta_1$, $\theta_2$] and/or [$\eta_1$, $\eta_2$]), the mobile station 401 can determine that the signal 411 is a jamming signal coming from a jamming device 405.

In some embodiments, when the mobile device 401 is in motion, movement of the mobile device 401 and/or its surroundings can impact the received GNSS signals. The GNSS signals may be attenuated; at times one or more satellites may not be visible. To ensure that the mobile device 401 can still estimate its location relative to the satellites when it is in motion, the cellular network can further provide information about the constellation of satellites. For example, the mobile device 401 can be initially configured to listen to GPS satellites. Based on the information provided by the cellular network, the mobile device 401 can listen to additional GNSS satellites from different global navigation satellite systems, such as the Global Navigation Satellite System (GLONASS), the Galileo satellite navigation system, and/or the BeiDou Navigation Satellite system (BDS), to compensate for any loss of signals. Based on its own location (e.g., determined based on assistance information) and additional satellite information from the cellular network, the mobile device 401 that is in motion can derive and refine the reception angle β of the jamming signal 411, thereby determining that the jamming signal 411 comes from a jamming device 405.

In some embodiments, a GNSS jammer is positioned to block signals from a satellite so as to mimic real satellite signals. In those cases, relying only on the actual reception angle of the incoming signal is not sufficient. The GNSS receiver can derive its estimated position based on other characteristics of the signal and determine whether the signal is a jamming signal or a satellite signal. For example, the GNSS receiver can expect certain parts of a message from a particular satellite. When the incoming signal fails to match the expected parts of the message, the incoming signal can be deemed as a jamming signal.

Figure 5:
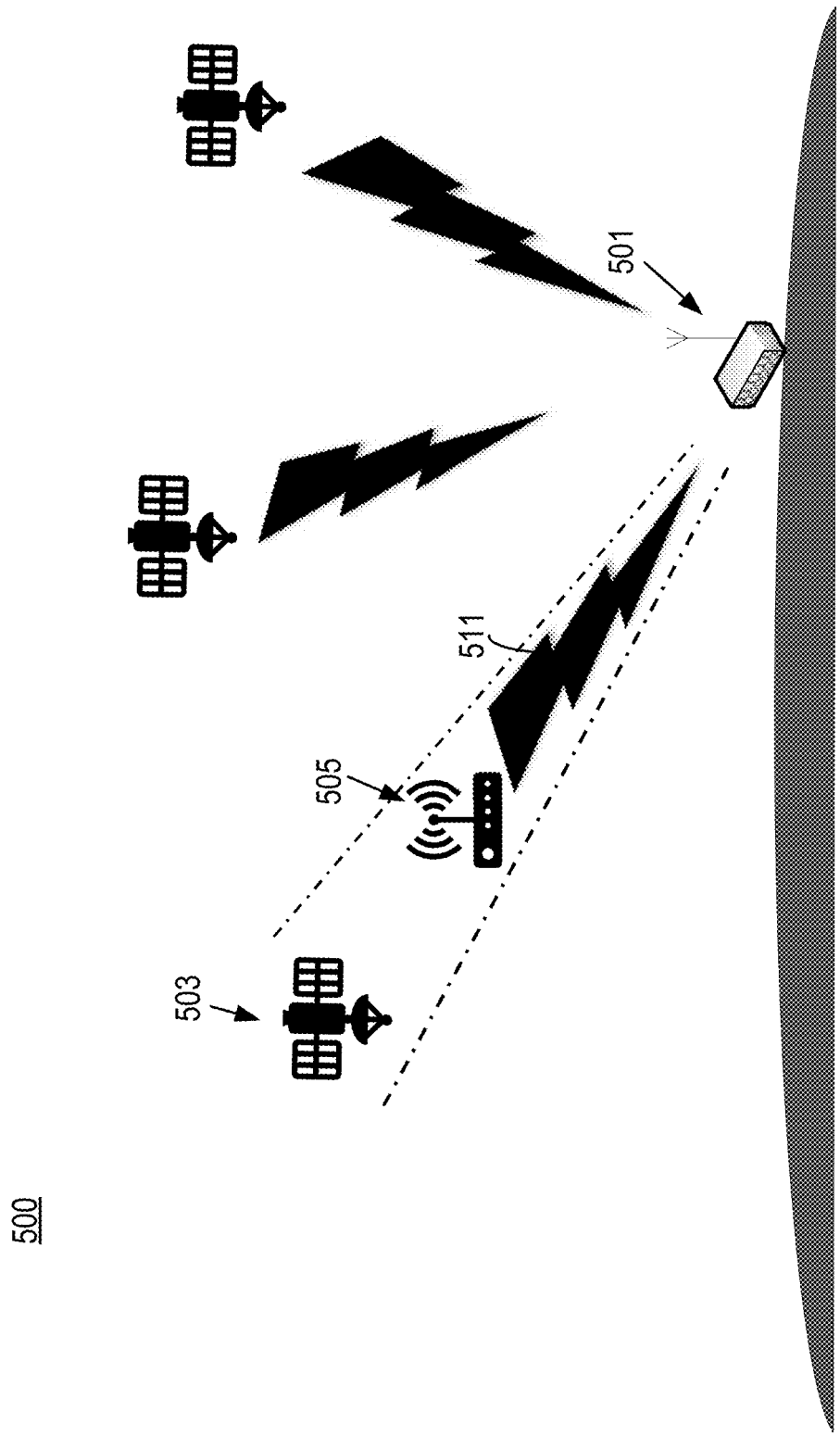
FIG. 5 illustrates an example of detecting a jamming signal that blocks a satellite signal in accordance with one or more embodiments of the present technology.

FIG. 5 illustrates an example 500 of detecting a jamming signal that blocks a satellite signal in accordance with one or more embodiments of the present technology. In FIG. 5, a GNSS jamming device 505 is positioned to block signals from a satellite 503. In some embodiments, interference between the signal 511 from the GNSS jamming device 505 and the signal from the satellite 403 causes the signal 511 to completely mask out the signal from satellite 503. In those cases, the GNSS receiver 501 can determine that the signal 511 is a jamming signal.

In some embodiments, the signal 511 from the GNSS jamming device 505 is interpreted by the GNSS receiver 501 as a signal from the satellite 503. However, the received signal 511 is deemed as invalid by the GNSS receiver 501 when the signal is corrupted or fails to match the expected parts of the message. Correspondingly, the GNSS receiver 501 can determine that the signal 511 is a jamming signal.

Figure 6:
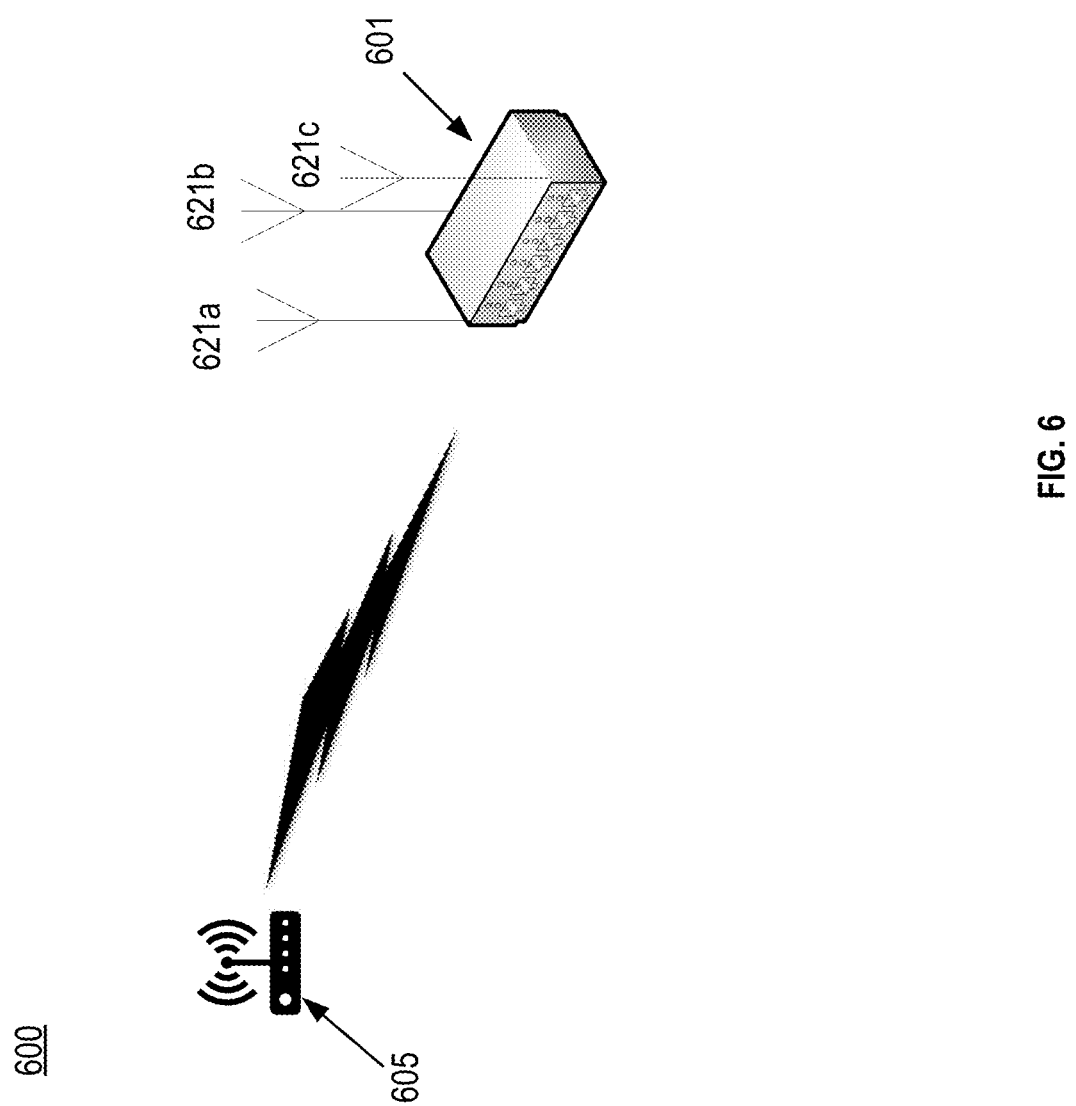
FIG. 6 illustrates an example of determining a location of a GNSS jamming device in accordance with one or more embodiments of the present technology.

In some embodiments, the signal 511 from the GNSS jamming device 505 is interpreted by the GNSS receiver 501 as a valid signal from the satellite 503. Based on the characteristics of the received signal 511 (e.g., the intensity of the signal), the GNSS receiver 501 calculates its estimated position and compares the estimated position with its reference position. Upon detecting that there is a mismatch between the estimated position and the reference position (e.g., the difference between the two positions exceeds a threshold), the GNSS receiver 501 can determine that the signal 511 is a jamming signal After detecting a jamming signal, the precise location of the GNSS jamming device can be determined based on information from one or more GNSS receivers. For example, Multiple-Input-Multiple-Output (MIMO) is an antenna technology for wireless communications in which multiple antennas are used as the transmitter and receiver. A GNSS receiver using MIMO technology can provide multiple estimated positions that facilitate the triangulation of the GNSS jamming device location. FIG. 6 illustrates an example 600 of determining a location of a GNSS jamming device 605 in accordance with one or more embodiments of the present technology. In FIG. 6, the GNSS receiver 601 is a fixed station equipped with multiple antennas 621a, 621b, 621c. Each of the antennas 621a, 621b, 621c can be used to derive an estimated location of the respective antenna upon receiving the signal from the GNSS jamming device 605. When the fixed station 601 has a large dimension and the antennas 621a, 621b, 621c are positioned reasonably apart from each other, multiple estimated positions can be used to triangulate the precise position of the GNSS jamming device 605.

Figure 7:
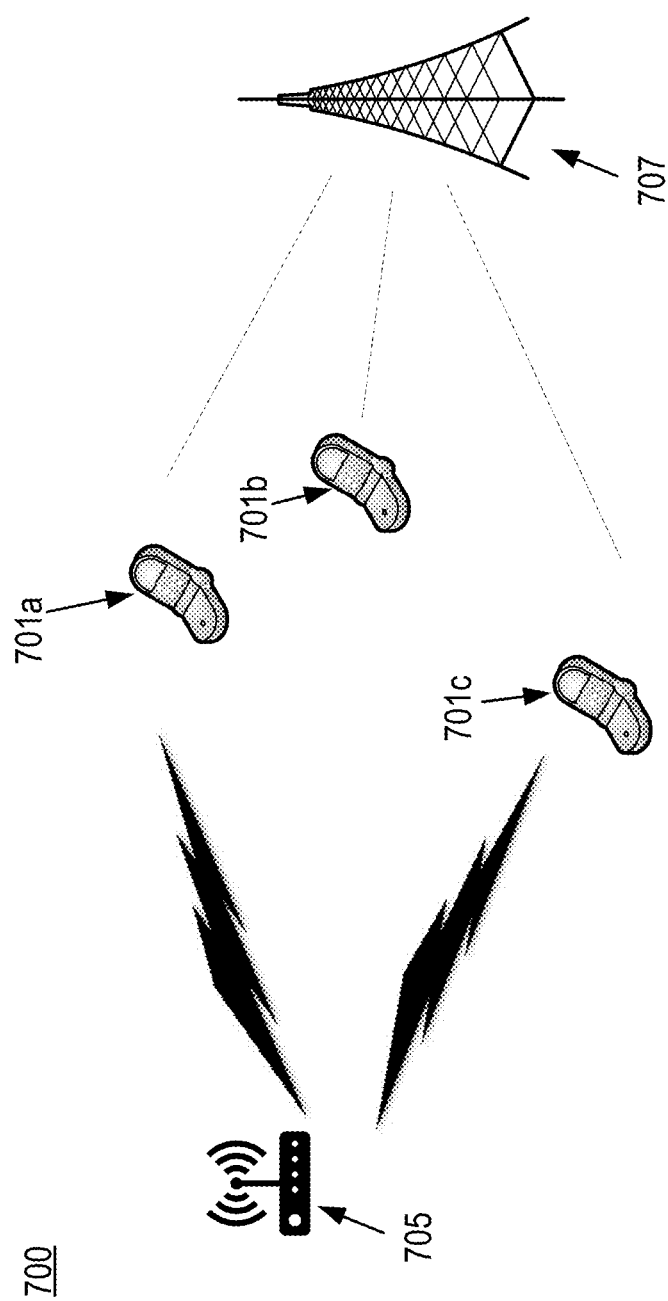
FIG. 7 illustrates another example of determining a location of a GNSS jammer in accordance with one or more embodiments of the present technology.

FIG. 7 illustrates another example 700 of determining a location of a GNSS jammer in accordance with one or more embodiments of the present technology. In FIG. 7, multiple mobile GNSS receivers 701a, 701b, 701c detect jamming signals from the GNSS jamming device 705. Each of the GNSS receivers 701a, 701b, 701c can determine an estimated position of the GNSS jamming device 705 relative to itself. The GNSS receivers then transmit the estimated positions to a communication node 707 (e.g., a base station). Based on information from multiple GNSS receivers, the communication node 707 can determine the location of the GNSS jamming device 705 using techniques such as triangulation. In particular, when a group of mobile devices within a cell or a few neighboring cells indicates that they have received a jamming signal, the network operator can easily determine where the jamming signals come from.

Figure 8:
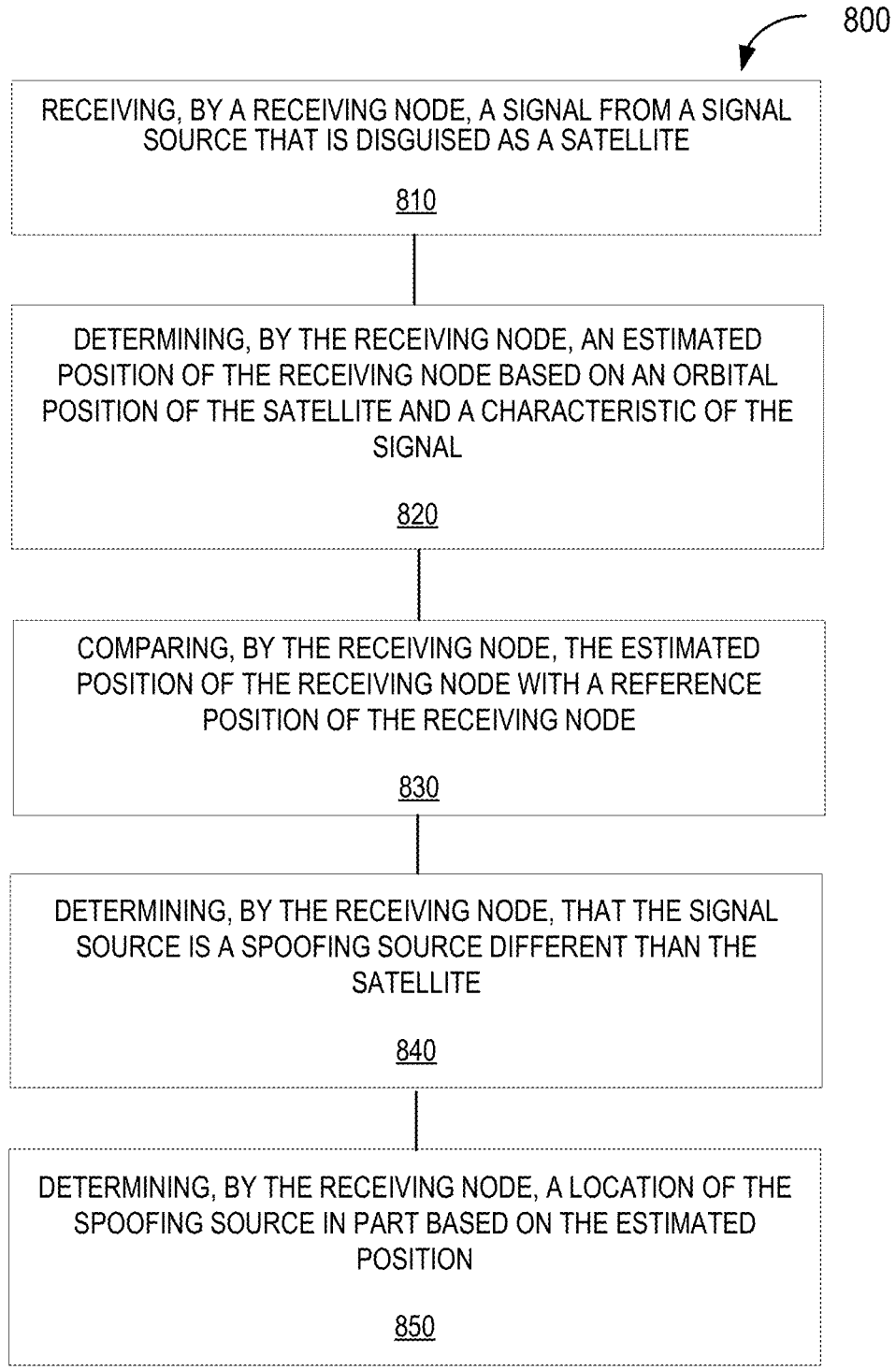
FIG. 8 illustrates a method for detecting a signal directed at interfering with satellite signaling in accordance with one or more embodiments of the present technology.

FIG. 8 illustrates a method 800 for detecting a signal directed at interfering with satellite signaling in accordance with one or more embodiments of the present technology. The method 800 includes, at operation 810, receiving, by a receiving node, a signal from a signal source. The signal source produces a signal to mimic signals of a satellite or otherwise disguises itself as a satellite. The method 800 includes, at operation 820, determining, by the receiving node, an estimated position of the receiving node based on an orbital position of the satellite and a characteristic of the signal. The method 800 includes, at operation 830, comparing, by the receiving node, the estimated position of the receiving node with a reference position of the receiving node. The method 800 includes, at operation 840, determining, by the receiving node, that the signal source is a spoofing source different than the satellite. The method 800 also includes, at operation 850, determining, by the receiving node, a location of the spoofing source in part based on the estimated position.

Figure 9:
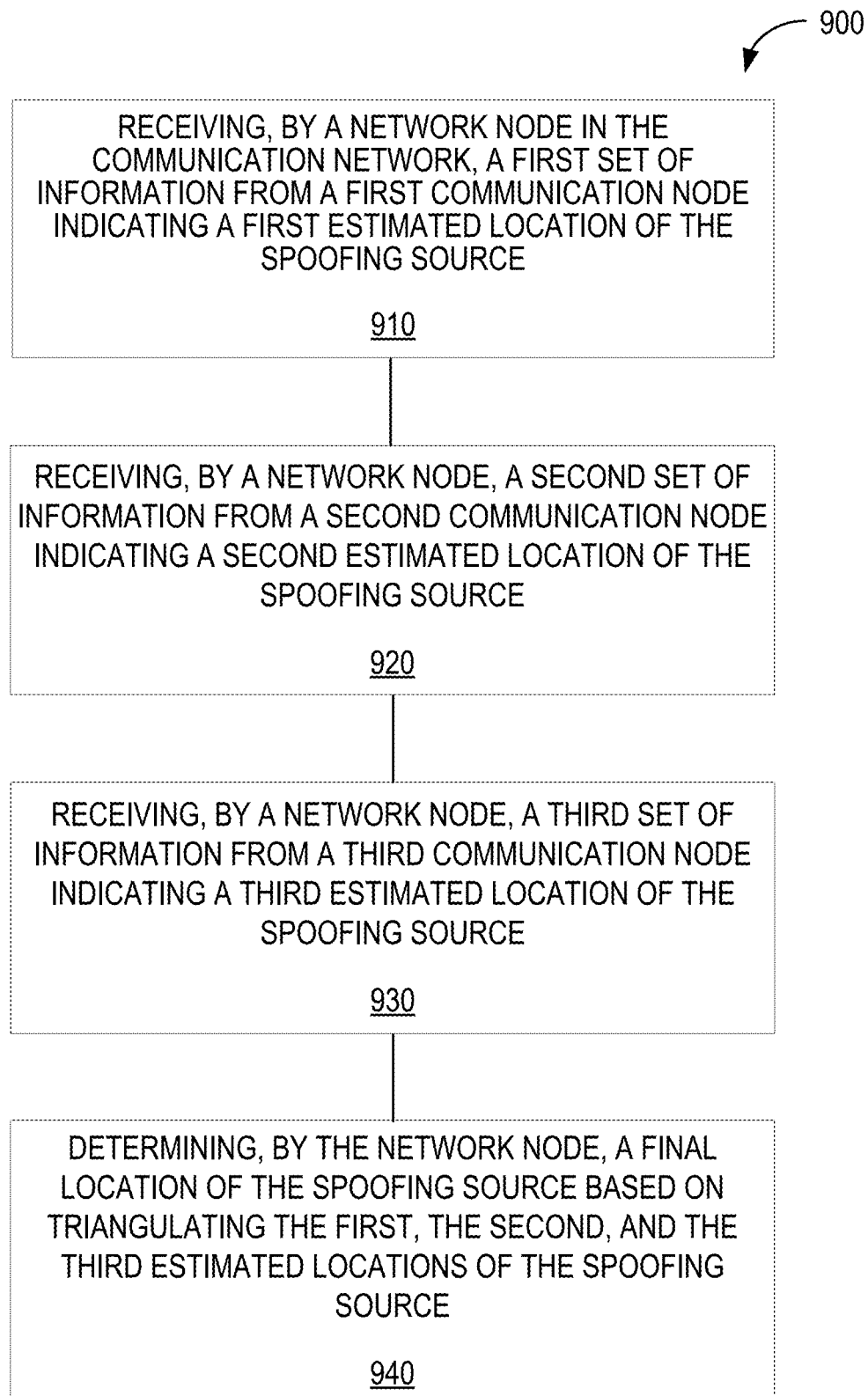
FIG. 9 illustrates a method for determining a location of a spoofing source in accordance with one or more embodiments of the present technology.

FIG. 9 illustrates a method 900 for determining a location of a spoofing source in accordance with one or more embodiments of the present technology. The method 800 includes, at operation 910, receiving, by a network node in the communication network, a first set of information from a first communication node indicating a first estimated location of the spoofing source. The method 900 includes, at operation 920, receiving, by a network node, a second set of information from a second communication node indicating a second estimated location of the spoofing source. The method 900 includes, at operation 930, receiving, by a network node, a third set of information from a third communication node indicating a third estimated location of the spoofing source. The method 900 also includes, at operation 940, determining, by the network node, a final location of the spoofing source based on triangulating the first, the second, and the third estimated locations of the spoofing source.

CONCLUSION

The present application discloses techniques that can be implemented in various embodiments to detect interfering signals from suspicious sources. The techniques can be implemented in both fixed base stations or mobile assets such as phones, tablets, autonomous cars, or IoT devices. The wide applicability of the disclosed techniques also enables the determination of the locations of the suspicious sources. Network operators can easily identify the locations of the suspicious sources based on information provided by base stations equipped with multiple antennas or a group of mobile devices.

Figure 10:
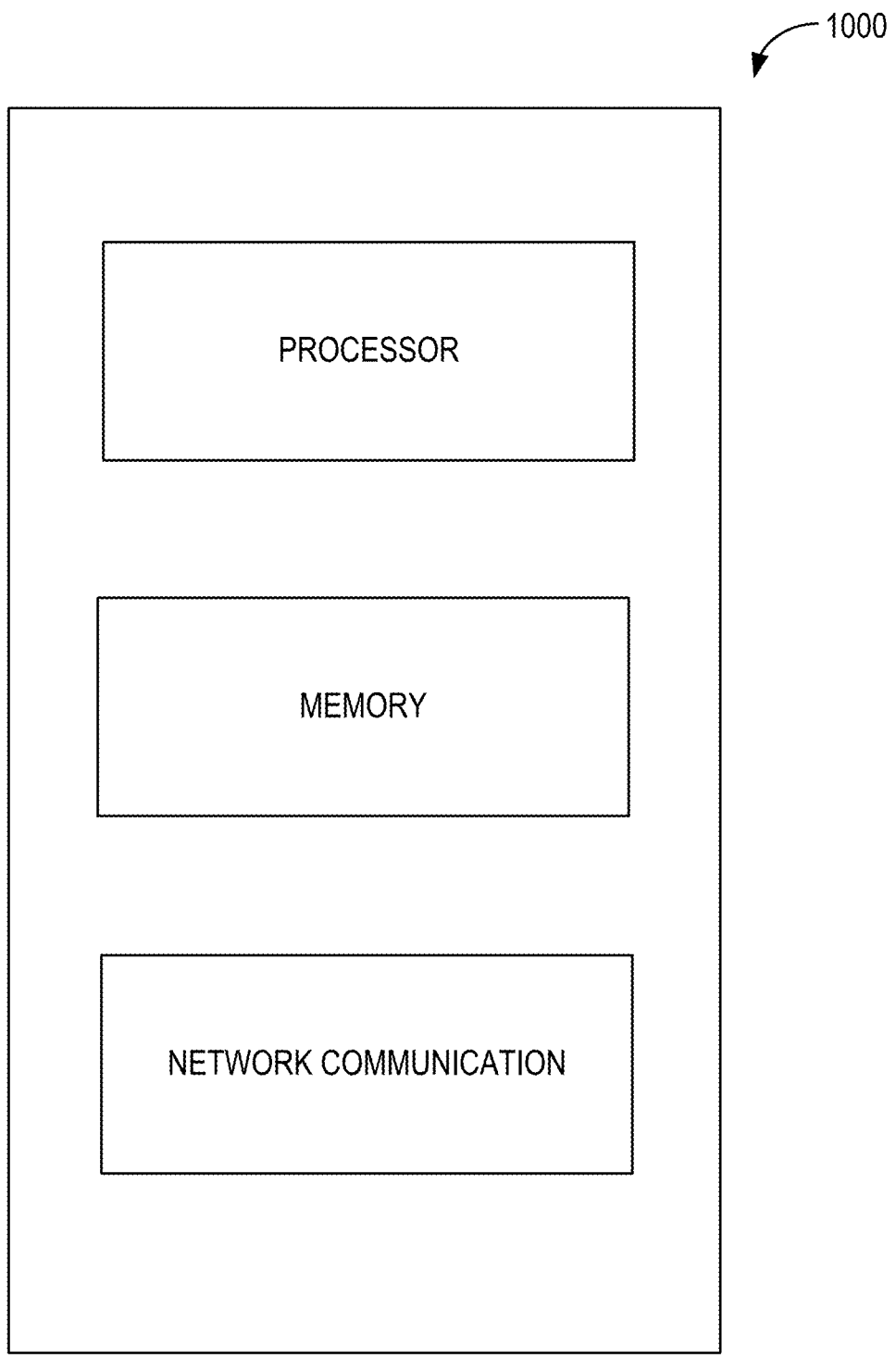
FIG. 10 is a diagrammatic representation of a machine in the example form of a computer system within which a set of instructions, for causing the machine to perform any one or more of the methodologies or modules discussed herein, can be executed.

FIG. 10 is a diagrammatic representation of a machine in the example form of a computer system 1000 within which a set of instructions, for causing the machine to perform any one or more of the methodologies or modules discussed herein, can be executed.

In the example of FIG. 10, the computer system 1000 includes a processor, memory, non-volatile memory, and a network communication interface device. The computer system 1000 can also include multiple antennas for receiving signals from various signal sources. Various common components (e.g., cache memory) are omitted for illustrative simplicity. The computer system 1000 is intended to illustrate a hardware device on which any of the components described in the example of FIGS. 1-8 (and any other components described in this specification) can be implemented. The computer system 1000 can be of any applicable known or convenient type. The components of the computer system 1000 can be coupled together via a bus or through some other known or convenient device.

This disclosure contemplates the computer system 1000 taking any suitable physical form. As example and not by way of limitation, computer system 1000 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 can include one or more computer systems 1000; be unitary or distributed; span multiple locations; span multiple machines; or reside in a cloud, which can include one or more cloud components in one or more networks. Where appropriate, one or more computer systems 1000 can perform without substantial spatial or temporal limitation one or more steps of one or more methods described or illustrated herein. As an example and not by way of limitation, one or more computer systems 1000 can perform in real time or in batch mode one or more steps of one or more methods described or illustrated herein. One or more computer systems 1000 can perform at different times or at different locations one or more steps of one or more methods described or illustrated herein, where appropriate.

The processor can be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory can not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that an antenna, a modem, or network interface can be considered to be part of the computer system 1000. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system 1000 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

The invention claimed is:

1. A mobile device for wireless communication operable to be in motion while detecting a spoofing signal directed at interfering with satellite signaling, comprising:
   a processor; and
   a memory including processor-executable instructions stored thereon, the processor-executable instructions upon execution by the processor configures the processor to:
      receive, while the mobile device is in communication with a cellular network and is in motion, a spoofing signal from a signal source and a plurality of signals from a constellation of satellites comprising different navigation satellite systems, wherein the signal source is disguised as a satellite in the constellation;
      derive a reception angle of the spoofing signal in part based on the plurality of signals from the different navigation satellite systems;
      upon determining that the reception angle is within a range of expected reception angles, make a preliminary determination that the spoofing signal is a valid signal from the satellite;
      in response to the preliminary determination that the spoofing signal is a valid signal from the satellite, determine an estimated position of the mobile device based on an orbital position of the satellite and a characteristic of the spoofing signal;
compare the estimated position of the mobile device with a reference position of the mobile device, wherein the reference position is determined based on assistance information that includes one or more cell identifiers from the cellular network;
determine that the signal source is a spoofing source different than the satellite in response to a difference between the estimated position and the reference position exceeding a threshold; and
determine a location of the spoofing source relative to the mobile device that is in motion in part based on the estimated position.

2. The mobile device of claim 1, wherein the processor-executable instructions further comprise instructions to receive location signals from multiple proximate receivers and determine the location of the spoofing source based the estimated position and received location signals.

3. The mobile device of claim 1, further comprising multiple antennas, and wherein the processor is configured to:
determine multiple estimated positions for the multiple antennas based on the orbital position of the satellite and the characteristic of the spoofing signal; and
determine the location of the spoofing source based on triangulation of the multiple estimated positions.

4. The mobile device of claim 1, wherein the processor is configured to receive ephemeris data and configuration information from the cellular network indicating the reference position of the mobile device, wherein the cellular network comprises a Long-Term Evolution (LTE) wireless network or a Fifth-Generation (5G) wireless network.

5. The mobile device of claim 1, wherein the mobile device is embedded in an autonomous vehicle or a wearable computing device.

6. The mobile device of claim 1, wherein the processor is further configured to derive a line-of-sight (LOS) signal from the signal source by removing oscillating noise from the spoofing signal based on an oscillating pattern.

7. The mobile device of claim 1, wherein the reception angle of the spoofing signal is represented using spherical coordinates.

8. The mobile device of claim 1, wherein the spoofing signal comprises Ephemeris information of the satellite, and wherein the processor is configured to determine the orbital position of the satellite in part based on the Ephemeris information.

9. The mobile device of claim 1, wherein the processor is configured to receive the plurality of signals from the constellation of satellites comprising different navigation satellite systems by:
receiving a first set of signals from a first navigation satellite system;
determining that at least part of the first set of signals is attenuated due to the mobile device being in motion; and
receiving a second set of signals from a second navigation satellite system in response to the determining, wherein the second navigation satellite system is different than the first navigation satellite system.

10. A method implemented on a wireless communication mobile device operable to be in motion while detecting a signal directed at interfering with satellite signaling, the method comprising:
receiving, by the mobile device that is in communication with a cellular network and is in motion, a signal from a signal source and a plurality of signals from a constellation of satellites comprising different navigation satellite systems, wherein the signal produced by the signal source is disguised as a satellite signal;
determining, by the mobile device, a reception angle of the signal from the signal source;
refining, by the mobile device, the reception angle of the signal using the plurality of signals received from the different navigation satellite systems;
upon determining that the refined reception angle is within a range of expected reception angles, making a preliminary determination by the mobile device that the signal is a valid signal from a satellite;
in response to the preliminary determination that the signal is a valid signal from the satellite, determining, by the mobile device, an estimated position of the mobile device based on an orbital position of the satellite and a characteristic of the signal;
comparing, by the mobile device, the estimated position of the mobile device with a reference position of the mobile device, wherein the reference position is determined based on assistance information that includes one or more cell identifiers from the cellular network;
determining, by the mobile device, that the signal source is a spoofing source different than the satellite in response to a difference between the estimated position and the reference position exceeding a threshold; and
determining, by the mobile device, a location of the spoofing source relative to the mobile device that is in motion in part based on the estimated position.

11. The method of claim 10, further comprising:
receiving, by the mobile device, location signals from multiple proximate receivers and determine the location of the spoofing source based the estimated position and received location signals.

12. The method of claim 10, wherein the mobile device comprises multiple antennas, the method further comprising:
determining multiple estimated positions for the multiple antennas based on the orbital position of the satellite and the characteristic of the signal; and
determining the location of the spoofing source based on triangulation of the multiple estimated positions.

13. The method of claim 10, comprising:
receiving, by the mobile device, configuration information from the cellular network indicating the reference position of the mobile device, wherein the cellular network comprises a Long-Term Evolution (LTE) wireless network or a Fifth-Generation (5G) wireless network.

14. The method of claim 10, further comprising:
deriving a line-of-sight (LOS) signal from the signal source by removing oscillating noise from the signal based on an oscillating pattern.

15. The method of claim 10, wherein the reception angle of the signal is represented using spherical coordinates.

16. The method of claim 10, wherein the signal comprises Ephemeris information of the satellite, and wherein the method further comprises:
determining the orbital position of the satellite in part based on the Ephemeris information.

17. The method of claim 10, wherein the receiving the plurality of signals from the constellation of satellites comprising different navigation satellite systems comprises:

receiving a first set of signals from a first navigation satellite system;

determining that at least part of the first set of signals is attenuated due to the mobile device being in motion; and receiving a second set of signals from a second navigation satellite system in response to the determining, wherein the second navigation satellite system is different than the first navigation satellite system.

18. A system for detecting a spoofing signal comprising:

a plurality of mobile communication nodes, wherein at least one of the plurality of mobile communication nodes is in communication with a cellular network and is in motion, and wherein each of the plurality of mobile communication nodes is configured to:

receive a signal from a signal source and a plurality of signals from a constellation of satellites comprising different navigation satellite systems, wherein the signal source is disguised as a satellite in the constellation, determine a reception angle of the signal from the signal source based on the plurality of signals from the different navigation satellite systems, upon determining that the reception angle is within a range of expected reception angles, make a preliminary determination by the mobile communication node that the signal is a valid signal from the satellite, in response to the preliminary determination that the signal is a valid signal from the satellite, determine an estimated position of the mobile communication node based on an orbital position of the satellite and a characteristic of the signal, compare the estimated position of the mobile communication node with a reference position of the mobile communication node, wherein the reference position is determined based on assistance information that includes one or more cell identifiers from the cellular network, determine, in response to a difference between the estimated position and the reference position exceeding a threshold, that the signal source is a spoofing source different than the satellite, and estimate a location of the spoofing source relative to the mobile communication node that is in motion in part based on the estimated position; and a network node in communication with the plurality of mobile communication nodes, wherein the network node is configured to:

receive the estimated location of the spoofing source relative to the plurality of mobile communication nodes, and determine a final location of the spoofing source based on triangulation of multiple estimated locations.

19. The system of claim 18, wherein each of the plurality of mobile communication nodes is configured to receive the plurality of signals from the constellation of satellites comprising different navigation satellite systems by:

receiving a first set of signals from a first navigation satellite system;

determining that at least part of the first set of signals is attenuated due to the mobile communication node being in motion; and receiving a second set of signals from a second navigation satellite system in response to the determining, wherein the second navigation satellite system is different than the first navigation satellite system.

* * * * *